United States Patent [19]

Blanchard et al.

[11] Patent Number: 5,409,409
[45] Date of Patent: Apr. 25, 1995

[54] MARINE APPARATUS

[75] Inventors: Clarence E. Blanchard, Kenosha, Wis.; Charles D. Strang, Antioch, Ill.; Charles L. Granie, Columbia, S.C.

[73] Assignee: Outboard Marine Corporation, Waukegan, Ill.

[21] Appl. No.: 799,735

[22] Filed: Nov. 22, 1991

Related U.S. Application Data

[63] Continuation of Ser. No. 637,620, Jan. 4, 1991, abandoned.

[51] Int. Cl.⁶ .............................................. B63H 5/12
[52] U.S. Cl. ............................................. 440/54; 440/57
[58] Field of Search ................. 440/49, 53, 54, 57, 440/61, 900

[56] References Cited

U.S. PATENT DOCUMENTS

| | | | |
|---|---|---|---|
| D. 300,021 | 2/1989 | Riley | D12/318 |
| 1,424,628 | 8/1922 | Drummond | 384/275 |
| 1,704,303 | 5/1929 | Savage | 248/641 |
| 1,783,446 | 12/1930 | Overbury | 384/439 |
| 1,805,812 | 5/1931 | De Witt | 114/65 R |
| 1,848,018 | 3/1932 | Maranville | 114/65 R |
| 1,894,710 | 1/1933 | Samuelson | 248/641 |
| 2,138,600 | 11/1938 | Harmon | 248/4 |
| 2,351,122 | 6/1944 | Hartzog | 114/82 |
| 2,822,142 | 2/1958 | Collins | 248/4 |
| 2,913,284 | 11/1959 | Zankl | 308/15 |
| 2,921,819 | 1/1960 | Rifkin | 308/22 |
| 3,145,003 | 8/1964 | Hart | 248/4 |
| 3,245,640 | 4/1966 | Ibbs | 248/4 |
| 3,269,351 | 8/1966 | Shimanckas | 115/18 |
| 3,355,200 | 11/1967 | Storch | 287/101 |
| 3,371,362 | 3/1968 | Butler | 9/6 |
| 3,452,704 | 7/1969 | Watkins | 115/41 |
| 3,604,674 | 9/1971 | Wilkerson | 249/4 |
| 3,629,885 | 12/1971 | Jackson | 9/1 R |
| 3,702,485 | 11/1972 | Thompson | 9/6 |
| 3,763,810 | 10/1973 | Payne | 114/271 |
| 3,790,977 | 2/1974 | Bombardier et al. | 9/6 |
| 3,809,343 | 5/1974 | Adams et al. | 248/4 |
| 4,227,480 | 10/1980 | Carras | 440/43 |
| 4,232,627 | 11/1980 | Glenn et al. | 440/61 |
| 4,239,172 | 12/1980 | Spitzmesser | 248/641 |
| 4,302,195 | 11/1981 | Bryant | 440/61 |
| 4,348,972 | 9/1982 | Parsons | 114/290 |
| 4,348,977 | 9/1982 | Okajima | 144/273 |
| 4,354,847 | 10/1982 | Blanchard | 440/61 |
| 4,355,986 | 10/1982 | Stevens | 440/53 |
| 4,367,860 | 1/1983 | Strang | 248/641 |
| 4,448,387 | 5/1984 | Gilbreath | 248/642 |
| 4,492,176 | 1/1985 | Arima | 114/56 |
| 4,545,559 | 10/1985 | Gilbreath | 248/642 |
| 4,582,435 | 4/1986 | Davis | 384/129 |
| 4,584,959 | 4/1986 | Allison | 114/288 |
| 4,637,332 | 1/1987 | Glime | 114/61 |
| 4,666,410 | 5/1987 | Anselm | 440/61 |
| 4,723,928 | 2/1988 | Riley | 440/900 |
| 4,742,795 | 5/1988 | DePrey et al. | 114/362 |
| 4,781,136 | 11/1988 | Van Der Veldon | 114/56 |
| 4,854,744 | 8/1989 | Thibodeau | 384/295 |
| 4,863,298 | 6/1989 | Laboureau | 114/61 |
| 4,872,857 | 10/1989 | Newman | 440/61 |
| 4,915,047 | 4/1990 | Lord et al. | 114/39 |
| 4,925,410 | 5/1990 | Boda | 440/900 |
| 4,930,744 | 6/1990 | Woodward | 440/900 |
| 4,976,637 | 12/1990 | Newell | 440/900 |

Primary Examiner—Robert J. Oberleitner
Assistant Examiner—Clifford T. Bartz
Attorney, Agent, or Firm—Michael, Best & Friedrich

[57] ABSTRACT

Marine apparatus comprising a boat hull including opposed walls extending generally in the fore and aft direction, and a mounting bracket connected to the walls for supporting a propulsion unit for pivotal movement relative to the boat about a generally horizontal axis.

41 Claims, 8 Drawing Sheets

Fig. 23

MARINE APPARATUS

This application is a continuation of application Ser. No. 637,620, filed Jan. 4, 1991, and now abandoned.

BACKGROUND OF THE INVENTION

The invention relates to boats and to arrangements for mounting propulsion units on boats.

The propulsion unit of an outboard motor is typically mounted on the laterally or transversely extending transom of a boat. The transom is, during various normal operating conditions, subjected to relatively large forces transverse to the transom, or in the fore and aft direction. The transom must therefore be a relatively thick, reinforced wall.

Attention is directed to the following U.S. patents:

| U.S. Pat. No. | Inventor | Issued |
| --- | --- | --- |
| 1,805,812 | | |
| 1,848,018 | Maranville | March 1, 1932 |
| 2,138,600 | Harmon | November 29, 1938 |
| 2,351,122 | Hartzog | June 13, 1944 |
| 3,145,003 | Hart | August 18, 1964 |
| 3,245,640 | Ibbs | April 12, 1966 |
| 3,269,351 | Shimanckas | August 30, 1966 |
| 3,371,362 | Butler | March 5, 1968 |
| 3,452,704 | Watkins | July 1, 1969 |
| 3,604,674 | Wilkerson | September 14, 1971 |
| 3,629,885 | Jackson | December 28, 1971 |
| 3,702,485 | Thompson | November 14, 1972 |
| 3,790,977 | Bombardier, et al. | February 12, 1974 |
| 3,809,343 | Adams et al. | May 7, 1974 |
| 4,302,195 | Bryant | November 24, 1981 |
| 4,348,972 | Parsons | September 14, 1982 |
| 4,354,847 | Blanchard | October 19, 1982 |
| 4,355,986 | Stevens | October 26, 1982 |
| 4,367,860 | Strang | January 11, 1983 |
| 4,492,176 | Arima | January 8, 1985 |
| 4,742,795 | DePrey | May 10, 1988 |

Attention is also directed to French Application No. 2,387,840 and Japanese Application No. 58-152691.

SUMMARY OF THE INVENTION

The invention provides marine apparatus comprising a boat hull including opposed first and second walls extending generally in the fore and aft direction, and means connected to the walls for supporting a propulsion unit for pivotal movement relative to the boat about a generally horizontal axis, the means including a kingpin bore.

The invention also provides marine apparatus comprising a boat hull including opposed first and second walls extending generally in the fore and aft direction, and means connected to the walls for supporting a propulsion unit for pivotal movement relative to the boat about a generally horizontal axis, the means including a mounting bracket which is connected to the walls for pivotal movement relative thereto about the axis and which includes a transom portion adapted to have mounted thereon an outboard motor.

The invention also provides a boat comprising a hull including opposed first and second walls extending generally vertically and in the fore and aft direction, and an unreinforced fiberglass rear wall extending generally vertically and between the opposed walls.

The invention also provides a boat comprising a hull including a bottom supported in part by generally parallel, spaced-apart first and second stringers extending in the fore and aft direction, the first stringer including a rearward portion forming a first wall, and a forward portion extending forwardly of the first wall, and the second stringer including a rearward portion forming a second wall opposed to the first wall, and a forward portion extending forwardly of the second wall, the first and second walls defining therebetween a space adapted to contain an outboard motor.

The invention also provides marine apparatus comprising a boat including a hull, an outboard motor including a propulsion unit mounted on the hull for pivotal movement relative thereto between a trimmed-in position, a tilted-up position, and a trimmed-out position between the trimmed-in position and the tilted-up position, a cover which extends above the outboard motor and which is mounted on the hull for movement relative thereto between a lower position wherein the cover affords movement of the propulsion unit between the trimmed-in position and the trimmed-out position, and an upper position, and means for moving the cover from the lower position to the upper position in response to movement of the propulsion unit from the trimmed-out position to the tilted-up position.

The invention also provides an outboard motor comprising a drive shaft housing having a forward edge, a propeller shaft rotatably supported by the drive shaft housing, an engine supported by the drive shaft housing and drivingly connected to the propeller shaft, a kingpin which is connected to the drive shaft housing and which defines a generally vertical steering axis, and means for supporting the drive shaft housing for pivotal movement relative to a boat about a generally horizontal tilt axis located aft of the forward edge.

The invention also provides mounting apparatus for supporting a propulsion unit on a boat, the apparatus comprising a mounting bracket having therein a kingpin bore which is adapted to rotatably house the kingpin of an outboard motor and which defines a generally vertical steering axis, and means defining a generally horizontal tilt axis located aft of the steering axis.

The invention also provides an outboard motor comprising a transom bracket adapted to be fixed to the transom of a boat, a swivel bracket mounted on the transom bracket for pivotal movement relative thereto about a generally horizontal tilt axis, a propulsion unit mounted on the swivel bracket for pivotal movement relative thereto about a generally vertical steering axis, and means for preventing pivotal movement of the swivel bracket relative to the transom bracket under all operating conditions.

The invention also provides an outboard motor comprising a propulsion unit adapted to be mounted on a boat for pivotal movement relative thereto about a generally horizontal tilt axis, the propulsion unit including a propeller shaft, an engine drivingly connected to the propeller shaft, and a cowling extending above the engine and having an upper surface defining an arc centered on the tilt axis.

The invention also provides marine apparatus comprising a mounting bracket including a first side portion adapted to be pivotally connected to a boat for pivotal movement relative thereto about a generally horizontal tilt axis, a second side portion adapted to be pivotally connected to the boat for pivotal movement relative thereto about the tilt axis, and upper and lower cross members which extend between the side portions and which are adapted to have mounted thereon a propulsion unit.

The invention also provides marine apparatus comprising a boat, means defining a generally vertical wall, and means for mounting a propulsion unit on the boat for pivotal movement relative thereto about a generally horizontal tilt axis, the means including a mounting bracket having a generally cylindrical inner surface defining a bore centered on the tilt axis, and a trunnion assembly including a generally cylindrical member which is connected to the wall and centered on the tilt axis, which extends through the bore, which has a generally cylindrical outer surface, and which has thereon a radially outwardly extending flange spaced from the wall, and an annular bearing located between the outer surface and the inner surface and between the flange and the wall.

The invention also provides marine apparatus comprising a boat hull including opposed first and second walls extending generally in the fore and aft direction, a mounting bracket adapted to support a propulsion unit and connected to the walls for pivotal movement relative thereto about a generally horizontal axis, tilt means including an extendible and contractible link extending between the hull and the mounting bracket for causing pivotal movement of the mounting bracket relative to the hull, and trim means for causing pivotal movement of the propulsion unit relative to the mounting bracket.

The invention also provides marine apparatus comprising a boat hull including opposed first and second walls extending generally in the fore and aft direction, a mounting bracket connected to the walls for pivotal movement relative thereto about a generally horizontal tilt axis, and tilt means for causing pivotal movement of the mounting bracket relative to the hull, the mounting bracket transmitting forces to the boat solely through the tilt axis and the tilt means.

The invention also provides marine apparatus comprising a boat hull including opposed first and second walls extending generally in the fore and aft direction, a mounting bracket connected to the walls for pivotal movement relative thereto about a generally horizontal tilt axis and relative to a normal operating position, and an extendible and contractible link having one end pivotally connected to the hull and having an opposite end connected to the mounting bracket for pivotal movement relative thereto about a generally horizontal axis located substantially directly beneath the tilt axis when the mounting bracket is in the normal operating position.

The invention also provides marine apparatus comprising a boat hull including opposed first and second walls extending generally in the fore and aft direction, a mounting bracket connected to the walls for pivotal movement relative thereto about a generally horizontal tilt axis, and tilt means for causing pivotal movement of the mounting bracket relative to the hull, the mounting bracket transmitting forces to the boat solely through the walls.

A principal feature of the invention is the provision of a boat hull including opposed structural walls which extend generally vertically and in the fore and aft direction and which are adapted to have a propulsion unit mounted thereon for pivotal movement relative thereto about a generally horizontal axis. The advantage of this construction is that most of the forces exerted on each wall by the propulsion unit lie in the plane of the wall, or extend perpendicular to the minor direction of the wall. The wall therefore does not have to be reinforced to the same extent as a conventional transom. This also allows the laterally and vertically extending rearward wall of the hull to be a relatively thin, unreinforced wall.

Another principal feature of the invention is the provision of a marine propulsion device comprising means for mounting a propulsion unit for pivotal movement about a generally horizontal axis extending substantially through the center of gravity of the propulsion unit. With a conventional outboard motor propulsion unit, the tilt axis is located aft of the steering axis or aft of the forward edge of the drive shaft housing. As a result, relatively small forces are exerted on the boat during tilting of the propulsion unit. Another advantageous result of this arrangement is that relatively little force is needed to tilt the propulsion unit.

Another principal feature of the invention is the provision of a cover which extends above an outboard motor, which is mounted on a boat hull for pivotal movement relative thereto about a generally horizontal axis, and which has an upper surface generally vertically aligned with the laterally adjacent upper surfaces of the hull. This gives the rearward end of the boat a continuous, generally horizontal upper surface extending above the outboard motor. The boat therefore looks more like a boat with a stern drive unit than a boat with an outboard motor.

Another principal feature of the invention is the provision of a mounting bracket adapted to be pivotally mounted on a boat and adapted to support a conventional outboard motor. Since the bracket is pivotally mounted, it is not necessary to pivot the swivel bracket of the outboard motor relative to the transom bracket of the outboard motor in order to tilt the propulsion unit. The invention therefore provides means for preventing pivotal movement of the swivel bracket relative to the transom bracket under all operating conditions.

Another principal feature of the invention is the provision of an outboard motor cowling having an upper surface defining an arc centered on the tilt axis. As a result of this construction, the distance between the tilt axis and the uppermost portion of the cowling remains substantially constant throughout the tilt and trim range of the outboard motor, so that the volume necessary to contain the motor can be minimized.

Other features and advantages of the invention will become apparent to those skilled in the art upon review of the following detailed description, claims and drawings.

DESCRIPTION OF THE DRAWINGS

FIG. 19 is a rear elevational view of the outboard motor shown in FIG. 16.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A marine apparatus 10 embodying the invention is illustrated in FIGS. 1-12.

The apparatus 10 comprises a recreational boat 14, preferably a fiberglass boat, including a hull 18. The hull 18 includes (see FIG. 10) an aft end 20, and a fiberglass bottom 22 supported in part by generally parallel, spaced-apart first and second or port and starboard supporting members or stringers 26 and 30, respectively, extending in the fore and aft direction, and by lateral or transverse supporting members 31 and 32 extending between the stringers 26 and 30. The stringers 26 and 30 are preferably made of plywood and are covered with fiberglass on all sides in order to resist deterioration and provide additional strength. Each of the stringers has a minor dimension or thickness extending laterally or from port to starboard. Each stringer 26 or 30 includes (see FIG. 10) a forward portion 34, and a rearward portion 38 having a height substantially greater than the height of the forward portion 34. Each of the rearward portions 38 is coated on its inner surface with additional fiberglass so as to form (see FIG. 5) a pair of opposed, facing first and second or port and starboard inner walls 42 and 46, respectively, extending generally vertically and in the fore and aft direction. The additional fiberglass has a pigment so as to hide the plywood of the stringers 26 and 30. The walls 42 and 46 are reinforced and receive loads directly from the below-described propulsion unit. Each of the walls 42 and 46 has an upper end and a thickness or minor dimension extending laterally or from port to starboard. Each of the walls has therein a circular bore 48, the reason for which is explained below. The walls 42 and 46 define therebetween a space 50 adapted to contain an outboard motor.

The boat hull 18 also includes (see FIG. 1) a lateral rear wall or "transom" 54 extending generally vertically and between the opposed walls 42 and 46. The wall 54 has a height substantially equal to the height of the walls 42 and 46. The wall 52 also has a minor dimension or thickness extending in the fore and aft direction, and the wall 52 is located at the forward ends of the rearward portions 38 of the stringers 26 and 30, i.e., at the forward ends of the walls 42 and 46. The wall 54 does not receive loads directly from the propulsion unit and therefore does not require significant reinforcement (such as plywood). Accordingly, in the illustrated construction, the wall 54 is simply a relatively thin sheet of unreinforced fiberglass similar to the rest of the hull 18 except for the walls 26 and 30.

The hull 18 also includes (see FIGS. 5 and 10) port and starboard outer walls 55 and 56 located outwardly of the inner walls 42 and 46, respectively. Each of the walls 55 and 56 has an upper end.

Figure 4:
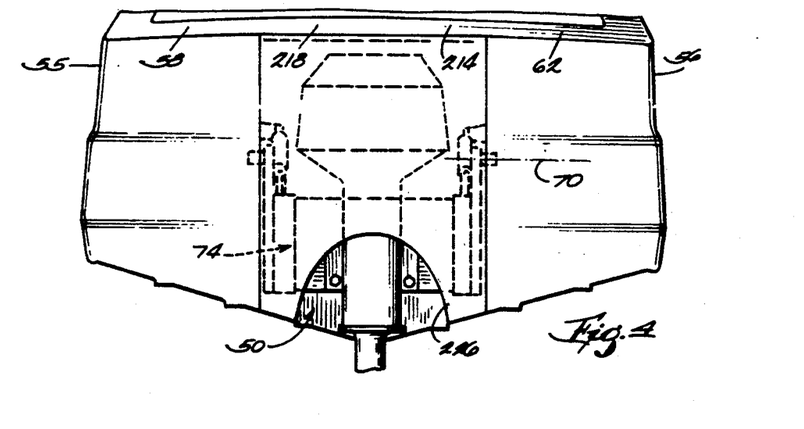
FIG. 4 is a partial rear perspective view of the apparatus.
Figure 5:
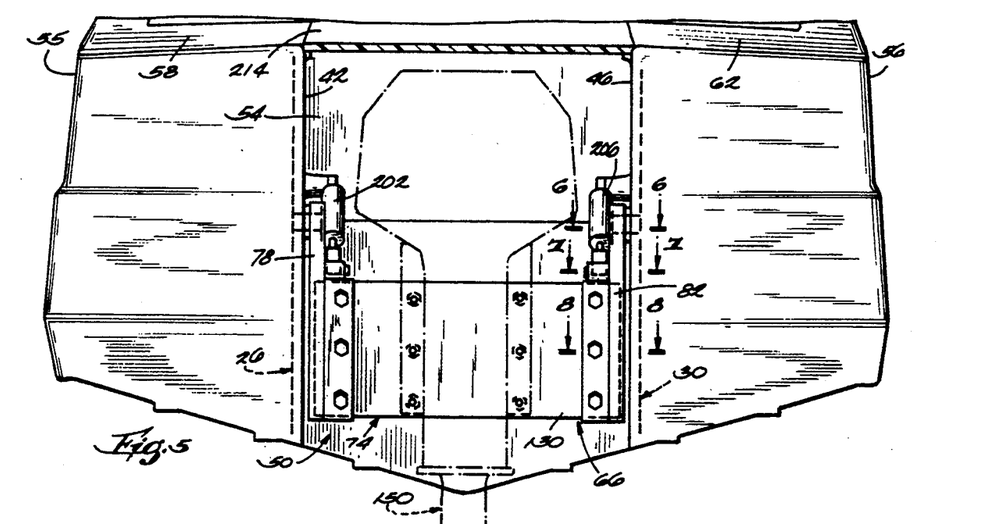
FIG. 5 is an enlarged rear perspective view with the cover removed and with the outboard motor shown in phantom.

The hull 18 also includes (see FIGS. 5 and 9) a first or port upper surface 58 extending laterally outwardly from the upper end of the first or port wall 42 and between the upper end of the wall 42 and the upper end of the wall 55, and a second or starboard upper surface 62 extending laterally outwardly from the upper end of the second or starboard wall 46 and between the upper end of the wall 46 and the upper end of the wall 56. As shown in FIGS. 4 and 5, the surfaces 58 and 62 are generally vertically aligned. The surfaces 58 and 62 preferably serve as swimming platforms.

The marine apparatus 10 also comprises means 66 connected to the walls 42 and 46 for supporting a propulsion unit for pivotal movement relative to the boat 14 about a generally horizontal tilt axis 70 (FIGS. 1, 4 and 9) which, in the illustrated embodiment, intersects the walls 42 and 46, extends through the centers of the bores 48, and is located aft of the lateral wall 54. The means 66 preferably includes (see FIGS. 5 and 12) a mounting bracket 74 connected to the walls 42 and 46 for pivotal movement relative thereto about the tilt axis 70. In the illustrated construction, the mounting bracket 74 includes (see FIG. 12) a first or port side portion 78 pivotally connected to the port wall 42, and a second or starboard side portion 82 pivotally connected to the starboard wall 46. Each of the side portions includes a generally vertically extending, channel-shaped lower member 83, and a channel-shaped upper member 84 extending upwardly and rearwardly from the lower member 83. Each of the side portions 78 and 82 also includes bearing means connected to the associated wall 42 or 46. The bearing means preferably include (see FIG. 6), in the upper end of each of the upper members 84 of the side portions 78 and 82, a cylindrical inner surface defining a bore 86 centered on the tilt axis 70. Each bore 86 rotatably receives a trunnion assembly 90 which extends inwardly from the associated wall and which is centered on the tilt axis 70. Each side portion 78 or 82 of the mounting bracket 74 is pivotable about the associated trunnion assembly 90 such that the mounting bracket 74 is pivotable about the tilt axis 70.

The trunnion assembly 90 includes (see FIG. 6) a generally cylindrical member or trunnion 94 having a reduced-diameter inner end portion 98 housed in the bore 48 in the associated wall 42 or 46, an increased-diameter outer end portion or radially outwardly extending flange 102, and a cylindrical outer surface 104 extending between the end portions 98 and 102. The trunnion 94 extends through the bore 86 in the associated side portion 78 or 82, and an annular bearing is located between the outer surface 104 of the trunnion 94 and the inner surface of the bore 86 of the associated side portion 78 or 82. The bearing preferably includes bearing portions 106 and. 108 that are made of polypropylene and that have an L-shaped cross section. The bearing portion 106 includes an increased-diameter inner portion or radially outwardly extending flange 110 extending between the associated side portion 78 or 82 and the associated wall 42 or 46. The bearing portion 108 has an increased-diameter outer portion or radially outwardly extending flange 112 extending between the associated side portion 78 or 82 and the increased-diameter portion or flange 102 of the trunnion 94. The trunnion 94 is secured to the associated wall by a bolt 114 extending through the trunnion 94. A nut 118 is threaded onto the inner end of the bolt 114, and a washer 122 is captured between the nut 118 and the inner surface of the wall 42 or 46. The trunnion 94 is preferably fabricated of aluminum, but could be fabricated of other materials such as steel or plastic. In the preferred embodiment, the trunnion 94 is stationary relative to the wall 42 or 46, and the side portion 78 or 82 of the mounting bracket 74 pivots relative to the trunnion 94.

The mounting bracket 74 also includes (see FIG. 12) a transom portion 130 which extends between the port and starboard portions 78 and 82 and which is adapted to have mounted thereon an outboard motor. In the illustrated construction, the transom portion 130 is fabricated of plywood and has port and starboard ends fixedly secured to the lower members 83 of the port and starboard side portions 78 and 82, respectively, by suitable means such as bolts 134.

Figure 1:
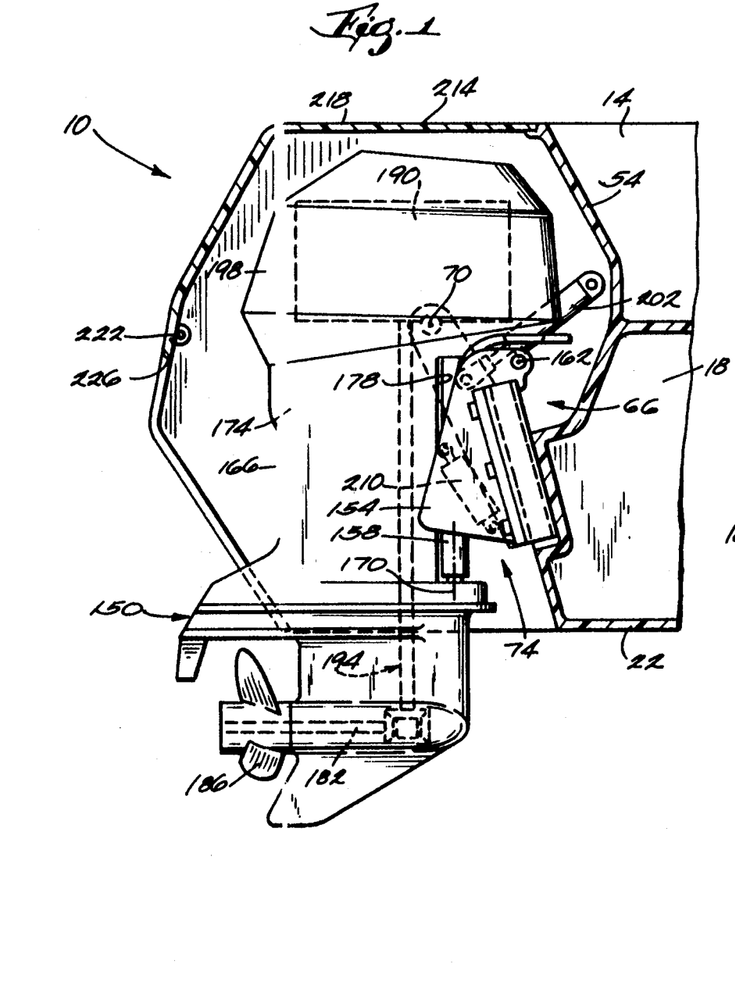
FIG. 1 is an elevational view, partially in section, of a marine apparatus embodying the invention.
Figure 2:
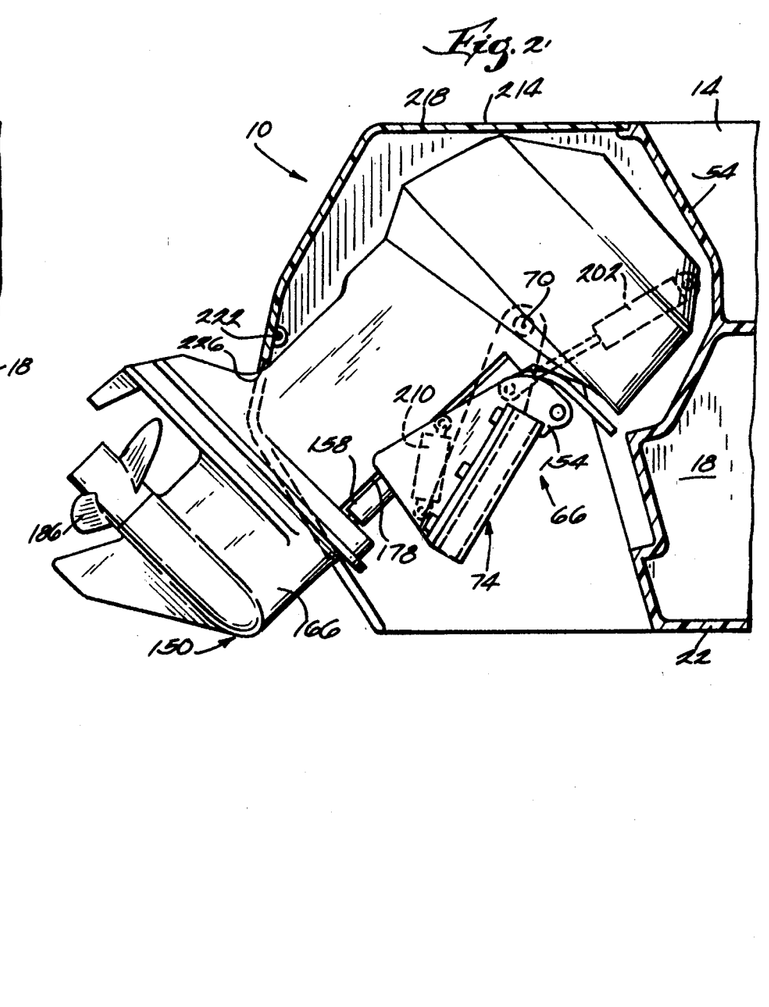
FIG. 2 is a view similar to FIG. 1 showing the propulsion unit in its tilted-up position.
Figures 3, 10, 11:
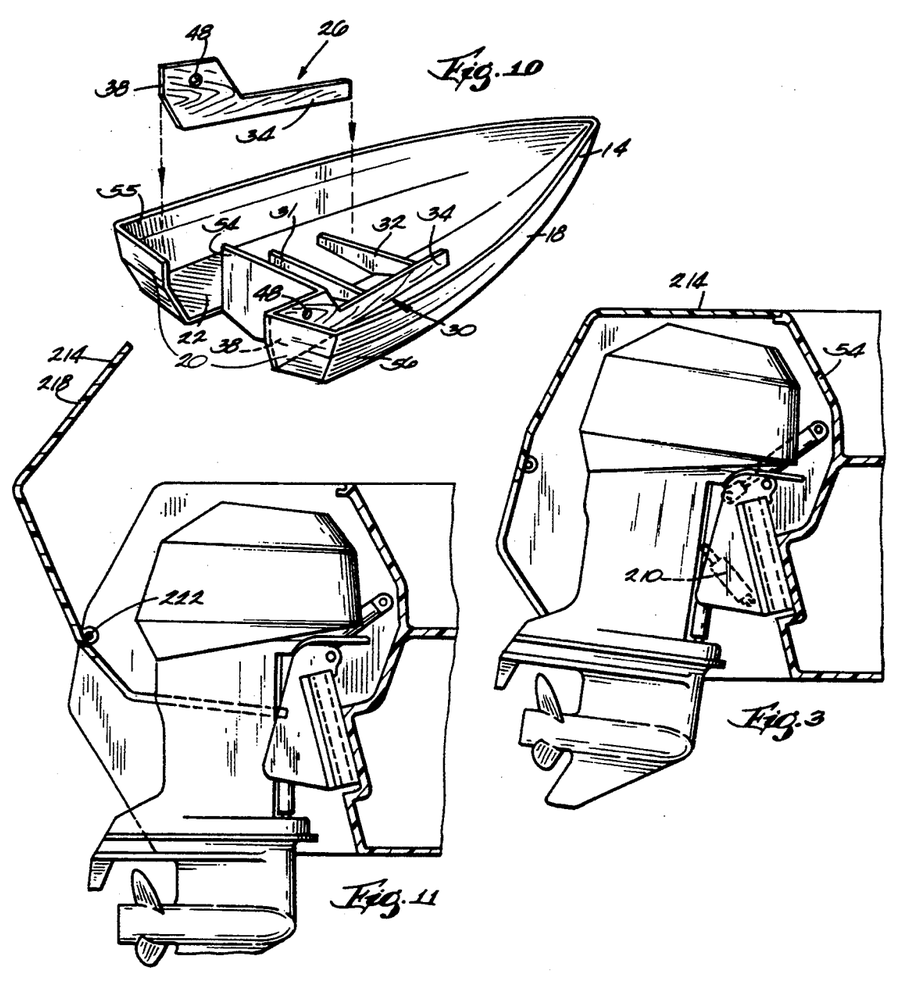
FIG. 3 is a view similar to FIG. 1 showing the propulsion unit in its trimmed-out position.
FIG. 10 is a partial, exploded perspective view of the boat hull.
FIG. 11 is a view similar to FIG. 1 showing the cover in its open position.

The marine apparatus 10 also comprises (see FIG. 1) an outboard motor 150 mounted on the transom portion 130 of the mounting bracket 74. As shown in FIGS. 1, 2 and 5, the outboard motor 150 has an upper end which is located beneath the upper surfaces 58 and 62 and beneath the upper ends of the inner walls 42 and 46 throughout the full range of tilting movement of the outboard motor 150. While the outboard motor 150 can have various suitable constructions, in the illustrated construction, the outboard motor 150 includes (see FIG. 1) a conventional transom bracket 154 fixedly mounted on the transom portion 130 of the mounting bracket 74 for common movement therewith. The outboard motor 150 also includes a conventional swivel bracket 158 mounted on the transom bracket 154 for pivotal movement relative thereto about a generally horizontal tilt axis 162, and a propulsion unit 166 mounted on the swivel bracket 158 for pivotal movement relative thereto about a generally vertical steering axis 170. The propulsion unit 166 includes a drive shaft housing 174 having a forward edge 178 located forwardly of the tilt axis 70, a propeller shaft 182 rotatably supported by the drive shaft housing 174, and a propeller 186 mounted on the propeller shaft 182. The propulsion unit 166 also includes an engine 190 supported by the drive shaft housing 174 and drivingly connected to the propeller shaft 182 by a conventional drive train 194. The propulsion unit 166 also includes a cowling or cover 198 which is mounted on the upper end of the drive shaft housing 174 and which surrounds the engine 190. The propulsion unit 166 has a center of gravity which, in the preferred embodiment, is located such that the tilt axis 70 extends substantially through the center of gravity.

The marine apparatus 10 also comprises tilt means for causing pivotal movement of the mounting bracket 74 relative to the hull 18. While various suitable tilt means can be used, in the illustrated construction, such means includes (see FIG. 5) a first or port extendible and contractible link 202 extending between the hull 18 and the port side portion 78 of the mounting bracket 74, and a second or starboard extendible and contractible link 206 extending between the hull 18 and the starboard side portion of 82 the mounting bracket 74. In the illustrated construction, each of the links 202 and 206 is a conventional hydraulic cylinder and piston assembly having a forward end pivotally connected to the associated wall 42 or 46 and a rearward end pivotally connected to the upper member 84 of the associated side portion 78 or 82 of the mounting bracket 74. Any suitable means (not shown) can be used for extending and contracting the hydraulic assemblies 202 and 206. The mounting bracket 74 is pivotable by the hydraulic assemblies 202 and 206 between a tilted-down position (shown in FIG. 3) and a tilted-up position (shown in FIG. 2).

The marine apparatus 10 further comprises trim means for causing pivotal movement of the propulsion unit 166 relative to the mounting bracket 74. While various suitable trim means can be employed, in the illustrated construction, such means includes (see FIG. 1) an extendible and contractible link 210 connected between the transom bracket 154 and the swivel bracket 158. The link 210 is preferably a conventional hydraulic cylinder and piston assembly. Any suitable means (not shown) can be used for extending and contracting the hydraulic assembly 210. The propulsion unit 166 is pivotable by the trim assembly 210 between a trimmed-in position (shown in FIG. 1) and a trimmed-out position (shown in FIG. 3).

In alternative embodiments (not shown), the apparatus 10 could have a gas spring (rather than the hydraulic assembly 210) between the transom bracket 154 and the swivel bracket 158, and the transom bracket 154 could support a trim pin (not shown) against which the swivel bracket 158 would rest during normal operation.

The marine apparatus 10 further comprises (see FIG. 1) a cover 214 extending above the outboard motor 150. The cover 214 has an upper surface 218 and is mounted on the hull 18 for pivotal movement relative thereto about a generally horizontal axis 222. In the illustrated construction, the cover 214 is pivotally connected to the walls 42 and 46 at a point near the rearward end of the boat 14. The cover 214 is pivotable relative to the hull 18 between a closed position (shown in FIGS. 1–3) in which the cover 214 substantially prevents access to the outboard motor 150, and an open position (shown in FIG. 11) in which the cover 214 affords access to the outboard motor 150. When the cover 214 is in its closed position, the upper surface 218 of the cover 214 is located above the outboard motor 150, and the upper surface 218 of the cover 214 and the upper surfaces 58 and 62 of the hull 18 are vertically aligned so as to provide the boat 14 with a continuous upper surface extending across the rear of the boat 14. The lower end of the cover 214 has therein an upwardly extending notch or recess 226 that affords pivotal movement of the propulsion unit 166 throughout its tilt range when the cover 214 is in its closed position.

Figures 6, 7, 8, 12, 13:
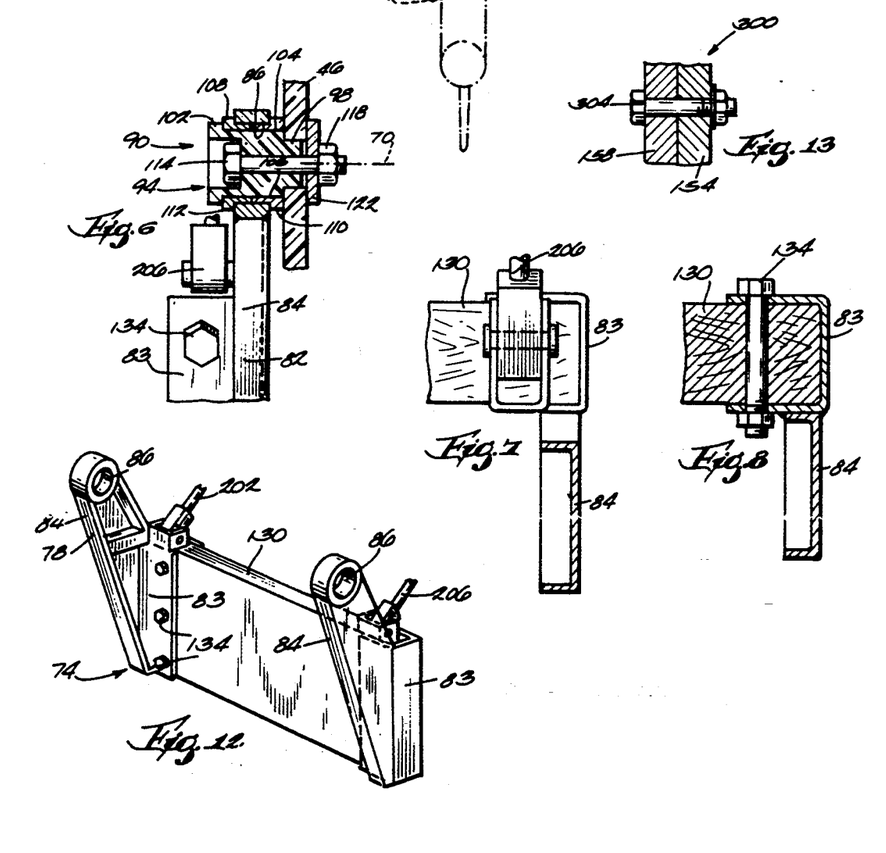
FIG. 6 is a view taken along line 6—6 in FIG. 5.
FIG. 7 is a view taken along line 7—7 in FIG. 5.
FIG. 8 is a view taken along line 8—8 in FIG. 5.
FIG. 12 is a perspective view of the mounting bracket of the apparatus shown in FIGS. 1-11.
FIG. 13 is a partial view of a first alternative embodiment of the invention.

A marine apparatus 300 which is an alternative embodiment of the invention is illustrated in FIG. 13. Except as described below, the marine apparatus 300 is substantially identical to the marine apparatus 10, and common elements have been given the same reference numerals.

In the marine apparatus 300, trimming and tilting of the propulsion unit 166 are both accomplished solely by pivoting the mounting bracket 74 relative to the boat 14. The outboard motor 150 therefore further includes means for preventing pivotal movement of the swivel bracket 158 relative to the transom bracket 154 under all operating conditions, including when the propulsion unit 166 strikes an underwater obstacle. While various suitable means can be employed, in the illustrated construction, such means includes a bolt 304 extending through the swivel bracket 158 and the transom bracket 154.

Figures 9, 14, 15:
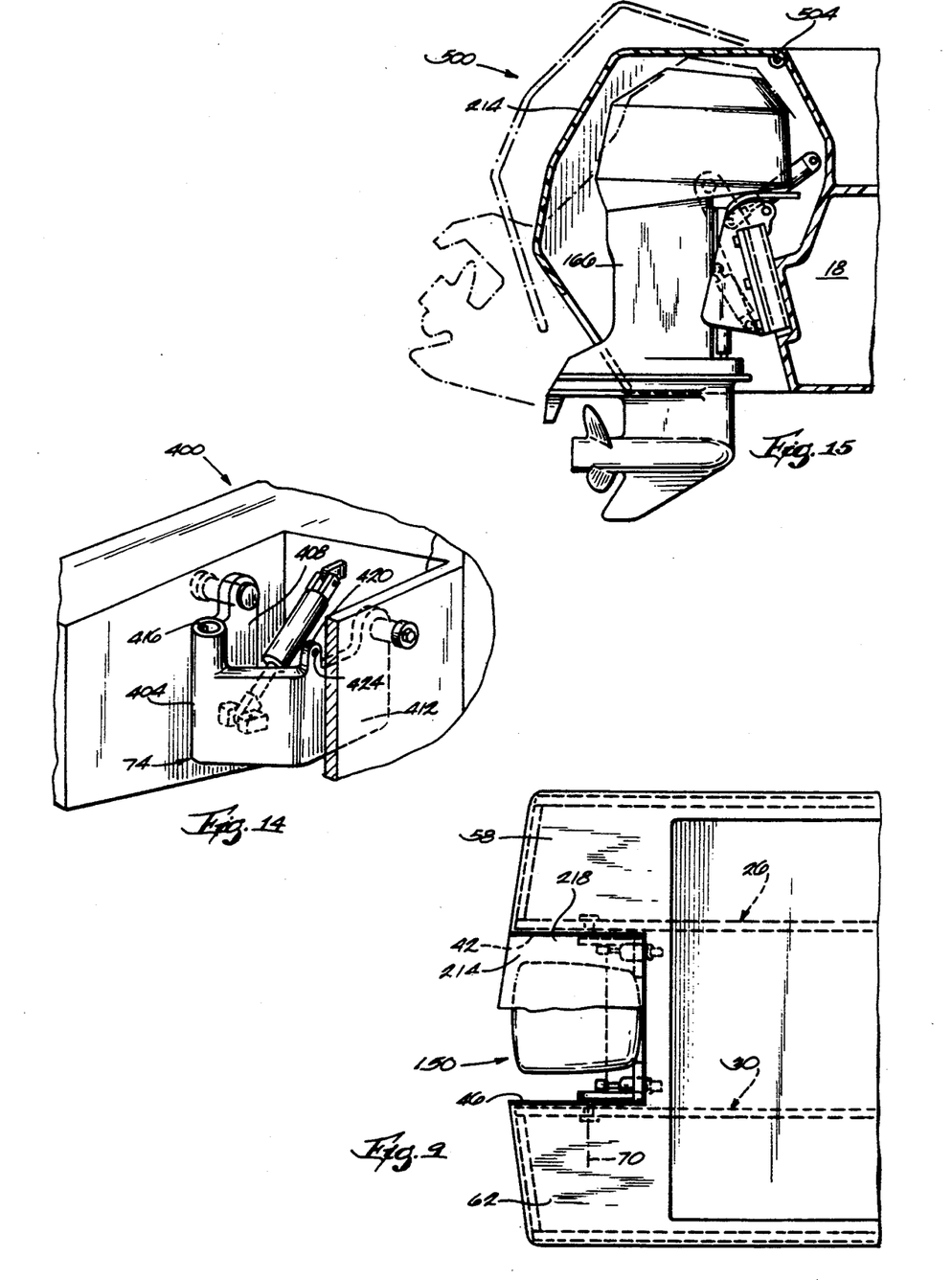
FIG. 9 is a partial top plan view of the apparatus.
FIG. 14 is a partial perspective view of a second alternative embodiment of the invention.
FIG. 15 is an elevational view, partially in section, of a third alternative embodiment of the invention.
Figure 15:
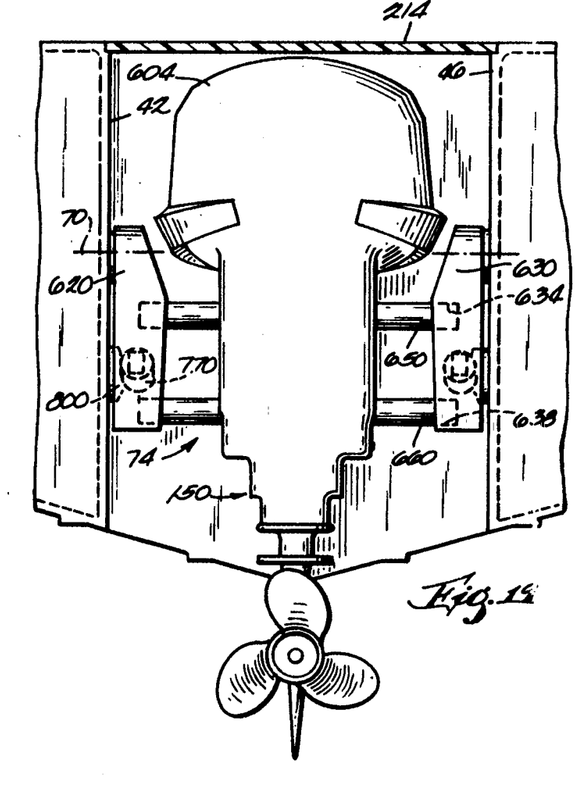

A marine apparatus 400 which is a second alternative embodiment of the invention is illustrated in FIG. 14. Except as described below, the marine apparatus 400 is substantially identical to the above-described marine apparatus 10, and common elements have been given the same reference numerals.

In the marine apparatus 400, the mounting bracket 74 includes an integral swivel bracket portion 404 which is connected directly and integrally to side portions 408 and 412 of the mounting bracket 74 and which has therein a kingpin bore 416 centered on the steering axis 194. The propulsion unit 166 is pivotally connected directly to the mounting bracket 74, with the kingpin (not shown) of the propulsion unit 166 extending through the kingpin bore 416. The transom bracket 154 and swivel bracket 158 of the marine apparatus 10 are omitted. The bracket 74 has thereon means for supporting a hydraulic steering assembly. This means preferably includes a projection 420 having therein a bore 424.

A marine apparatus 500 which is a third alternative embodiment of the invention is illustrated in FIG. 15. Except as described below, the marine apparatus 500 is substantially identical to the marine apparatus 10, and common elements have been given the same reference numerals.

In the marine apparatus 500, the cover 214 has a forward end mounted on the hull 18 for pivotal movement relative thereto about a generally horizontal axis 504. The cover 214 is movable between a lower or closed position (shown in solid lines in FIG. 15), an open position (not shown), and an upper position (shown in phantom in FIG. 15) intermediate the closed and open positions. The cover 214 affords movement of the propulsion unit 166 between its trimmed-in position (FIG. 1) and its trimmed-out position (FIG. 3) when the cover 214 is in its lower or closed position.

The marine apparatus 500 further comprises means for moving the cover 214 from its lower or closed position to its upper position in response to movement of the propulsion unit 166 from its trimmed-out position to its tilted-up position. This means preferably includes engagement of the cover 214 by the propulsion unit 166. More particularly, the propulsion unit 166 engages the rearward or lower end of the cover 214 when the propulsion unit 166 moves beyond its trimmed-out position, and further tilting of the propulsion unit 166 toward its tilted-up position causes pivotal movement of the cover 214 from its lower position to its upper position.

Thus, the upper surfaces 58 and 62 of the hull 18 and the upper surface 218 of the cover 214 provide a continuous surface when the propulsion unit 166 is within its trim range, but the cover 214 tilts up when the propulsion unit 166 is tilted up.

A marine apparatus 600 which is a fourth alternative embodiment of the invention is illustrated in FIGS. 16–19. Except as described below, the marine apparatus 600 is substantially identical to the marine apparatus 10, and common elements have been given the same reference numerals.

Figures 16, 21:
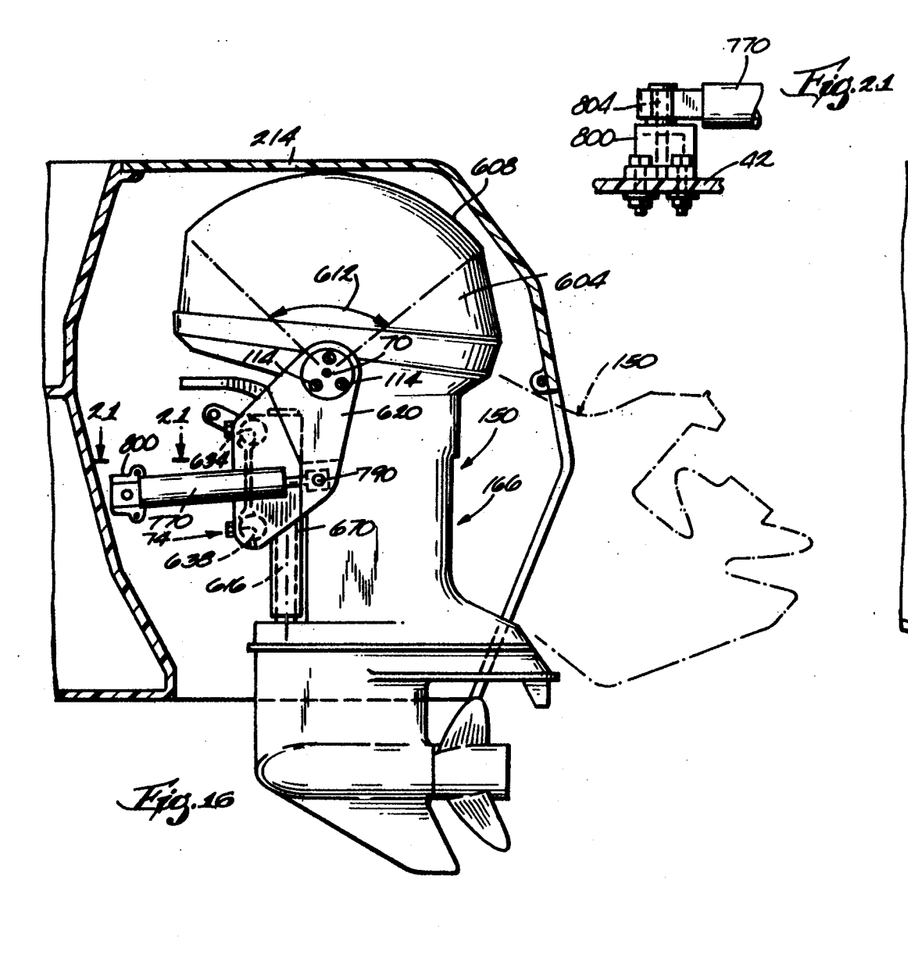
FIG. 16 is an elevational view, partially in section, of a fourth alternative embodiment of the invention.
FIG. 21 is a view taken along line 21—21 in FIG. 16.
Figure 17:
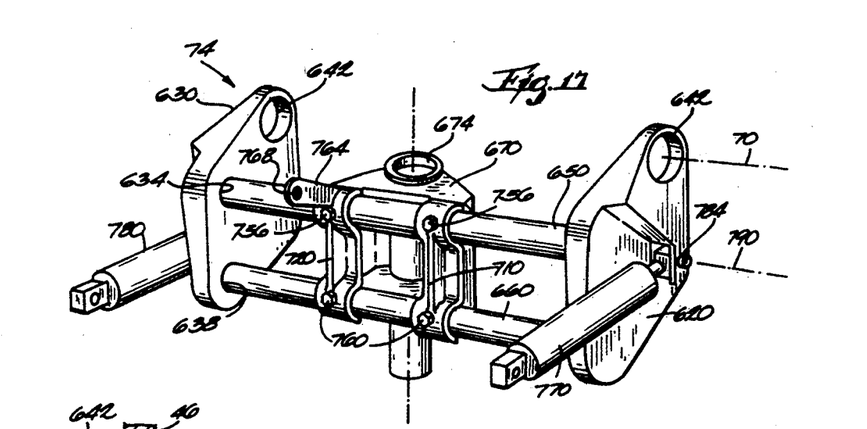
FIG. 17 is a partial perspective view of the mounting arrangement shown in FIG. 16.

In the marine apparatus 600, the outboard motor 150 includes a cowling 604 extending above and surrounding the engine 190. The cowling 604 has an upper surface 608 defining an arc which is centered on the tilt axis 70 and which has an arcuate length 612 of approximately 90°. The result of this construction is that, throughout the tilt and trim range of the propulsion unit, i.e., from the trimmed-in position to the tilted-up position, the uppermost portion of the cowling 604 is a constant distance from the tilt axis 70. This allows the distance from the tilt axis 70 to the cover 214, and therefore the volume of the cavity containing the outboard motor 150, to be minimized. Also, the propulsion unit 166 of the marine apparatus 600 includes a conventional kingpin 616.

Figures 18, 20:
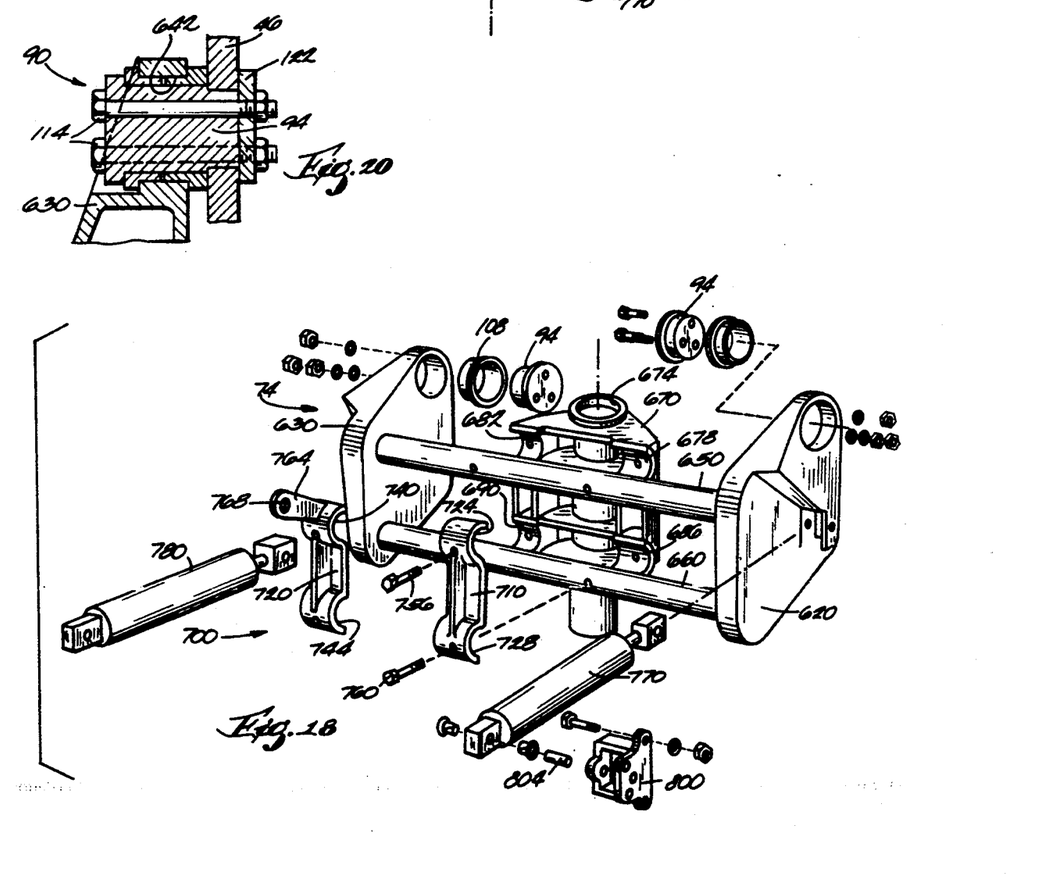
FIG. 18 is an exploded perspective view of the mounting arrangement shown in FIG. 17.
FIG. 20 is a view similar to FIG. 6 of the apparatus shown in FIG. 16.

The mounting bracket 74 of the marine apparatus 600 includes (see FIGS. 17 and 18) a first or port side portion 620 pivotally connected to the port wall 42 for pivotal movement relative thereto about the tilt axis 70, and a second or starboard side portion 630 pivotally connected to the starboard wall 46 for pivotal movement relative thereto about the tilt axis 70. The side portions 620 and 630 include respective upper and lower bores 634 and 638, the reason for which is explained hereinafter. The side portions 620 and 630 also include respective cylindrical bores 642 which are centered on the tilt axis 70 and which correspond to the bores 86 of the marine apparatus 10, and the side portions are pivotally connected to the walls 42 and 46 by the trunnion assemblies 90, as shown in FIG. 20. The cylindrical member 94 of each trunnion assembly 90 is secured to the associated wall by three bolts 114 (FIGS. 16 and 20).

The mounting bracket 74 also includes upper and lower cross members 650 and 660, respectively, extending between the side portions 620 and 630. In the illustrated construction, the cross members 650 and 660 are cylindrical tubes. The upper cross member 650 has opposite ends housed in the upper bores 634 in the side portions, and the lower cross member 660 has opposite ends housed in the lower bores 638 in the side portions.

The mounting bracket 74 further includes (see FIGS. 17 and 18) a swivel bracket portion 670 having therein a kingpin bore 674 rotatably housing the kingpin 616 of the propulsion unit 166. The swivel bracket portion 670 has therein (see FIG. 18) first and second or port and starboard upper arcuate recesses 678 and 682, respectively, and first and second or port and starboard lower recesses 686 and 690, respectively. The mounting bracket 74 further includes clamp means 700 for connecting the swivel bracket portion 670 to the cross members 650 and 660. The clamp means 700 includes first and second or port and starboard clamp portions 710 and 720. The port clamp portion 710 has therein upper and lower arcuate recesses 724 and 728 respectively mating with the port upper and lower recesses 678 and 686 in the swivel bracket portion 670 to define port upper and lower bores respectively housing the upper and lower cross members 650 and 660. The starboard clamp portion 720 has therein upper and lower arcuate recesses 740 and 744 respectively mating with the starboard upper and lower recesses 682 and 690 in the swivel bracket portion 670 to define starboard upper and lower bores respectively housing the upper and lower cross members 650 and 660. Means are provided for connecting the clamp portions 710 and 720 to the swivel bracket portion 670. While various suitable means can be employed, in the illustrated construction, such means includes, for each of the clamp portions 710 and 720, an upper bolt 756 extending through the clamp portion, the upper cross member 650 and the swivel bracket portion 670, and a lower bolt 760 extending through the clamp portion, the lower cross member 660 and the swivel bracket portion 670.

In the illustrated construction, the starboard clamp portion 720 includes means for supporting a conventional steering apparatus (not shown). While various suitable means can be employed, in the illustrated construction, such means includes a projection 764 which extends from the clamp portion 720 and which has therein a bore 768.

In the marine apparatus 600, the tilt means includes a first or port extendible and contractible link 770 extending between the hull 18 and the port side portion 620, and a second or starboard extendible and contractible link 780 extending between the hull 18 and the starboard side portion 630. In the illustrated construction, the links 770 and 780 are conventional hydraulic cylinder/piston assemblies.

Means are provided for pivotally connecting the rearward ends of the assemblies 770 and 780 to the side portions 620 and 630. While various suitable means can be used, such means preferably includes (see FIG. 18) pins 784 (only one is shown). The assemblies 770 and 780 are connected to the side portions 620 and 630 for pivotal movement relative thereto about a generally horizontal axis 790 which, as shown in FIG. 16, is preferably located substantially directly beneath the tilt axis 70 when the mounting bracket 74 is in its normal operating position (FIG. 16).

Means are also provided for pivotally connecting the forward ends of the hydraulic assemblies 770 and 780 to the hull 18. While various suitable means can be employed, in the illustrated construction, such means includes, for each of the assemblies 770 and 780, a pivot bracket 800 (FIGS. 16 and 18) fixedly mounted on the associated wall 42 or 46. Each of the hydraulic assemblies 770 and 780 is pivotally connected to the associated pivot bracket 800 by suitable means such as a pin 804 (FIG. 18). The pivot brackets 800 are preferably located such that the hydraulic assemblies 770 and 780 extend generally horizontally when the mounting bracket 74 is in its normal operating position.

As shown in FIG. 16, the mounting bracket 74 engages the hull 18 only through the trunnion assemblies 90 and the hydraulic assemblies 770 and 780. As a result, the mounting bracket 74 transmits forces from the propulsion unit 166 to the boat 14 solely through the tilt axis 70 (through the trunnion assemblies 90) and the hydraulic assemblies 770 and 780. Furthermore, since the trunnion assemblies 90 and the hydraulic assemblies 770 and 780 are connected to the side walls 42 and 46, the mounting bracket 74 transmits forces to the boat 14 solely through the side walls 42 and 46. As explained previously, this permits the lateral wall 54 to be constructed of unreinforced fiberglass.

Figure 22:
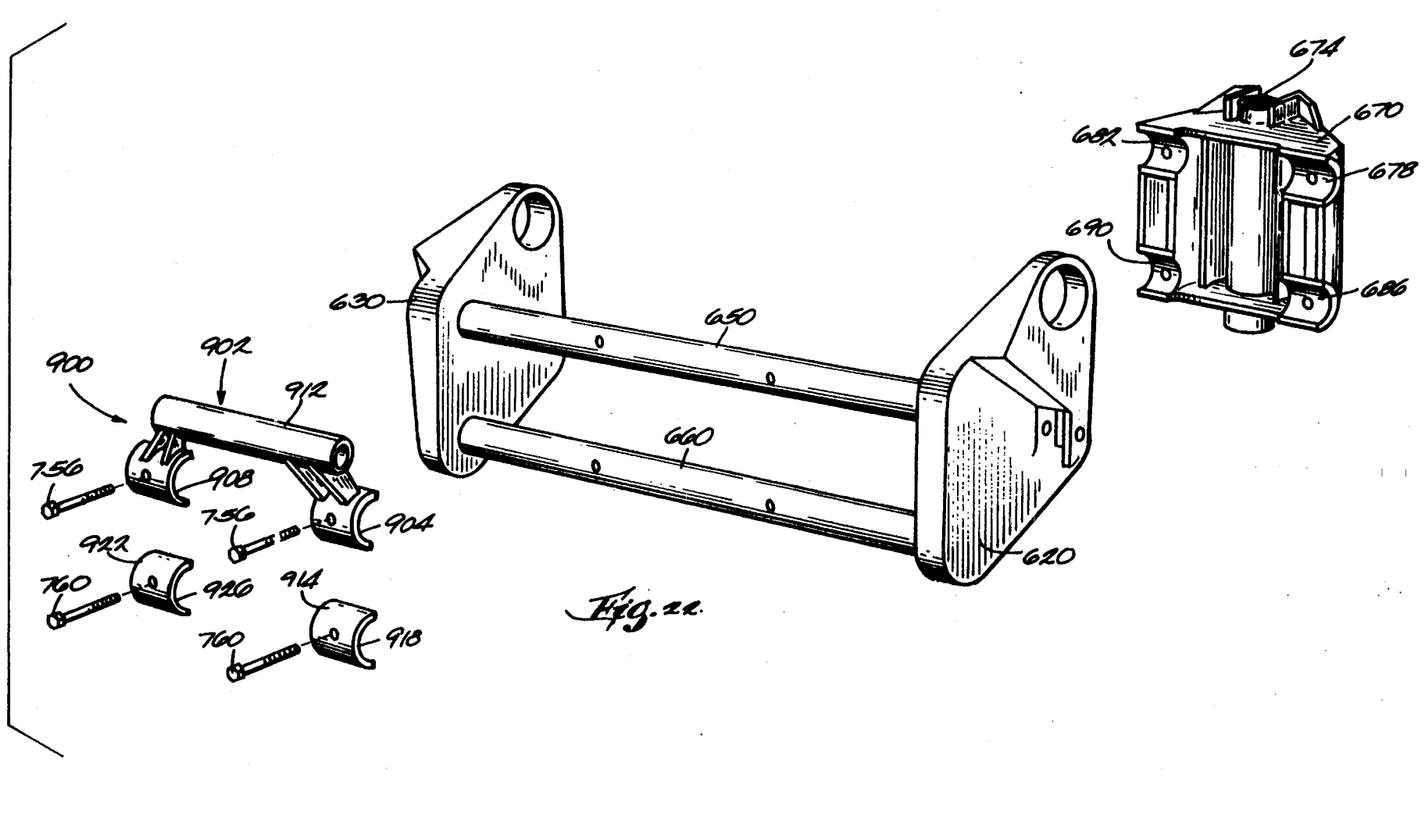
FIG. 22 is an exploded perspective view similar to FIG. 18 of an alternative mounting arrangement.

A clamp means 900 which is an alternative to the clamp means 700 is shown in FIG. 22. The clamp means 900 includes an upper clamp portion 902 including port and starboard upper arcuate recesses 904 and 908 respectively mating with the port and starboard upper recesses 678 and 682 of the swivel bracket portion 670. The upper clamp portion 902 also includes an integral steering tube 912 adapted to support a conventional steering apparatus (not shown). The clamp means 900 also includes a port lower clamp portion 914 having therein an arcuate recess 918 mating with the port lower recess 686 in the swivel bracket portion 670 to define the port lower bore, and a starboard lower clamp portion 922 having therein an arcuate recess 926 mating with the starboard lower recess 690 in the swivel bracket portion 670 to define the starboard lower bore. The upper clamp portion 902 is secured to the swivel bracket portion 670 by the bolts 756, and the lower clamp portions 914 and 922 are secured to the swivel bracket portion 670 by the bolts 760.

Figure 23:
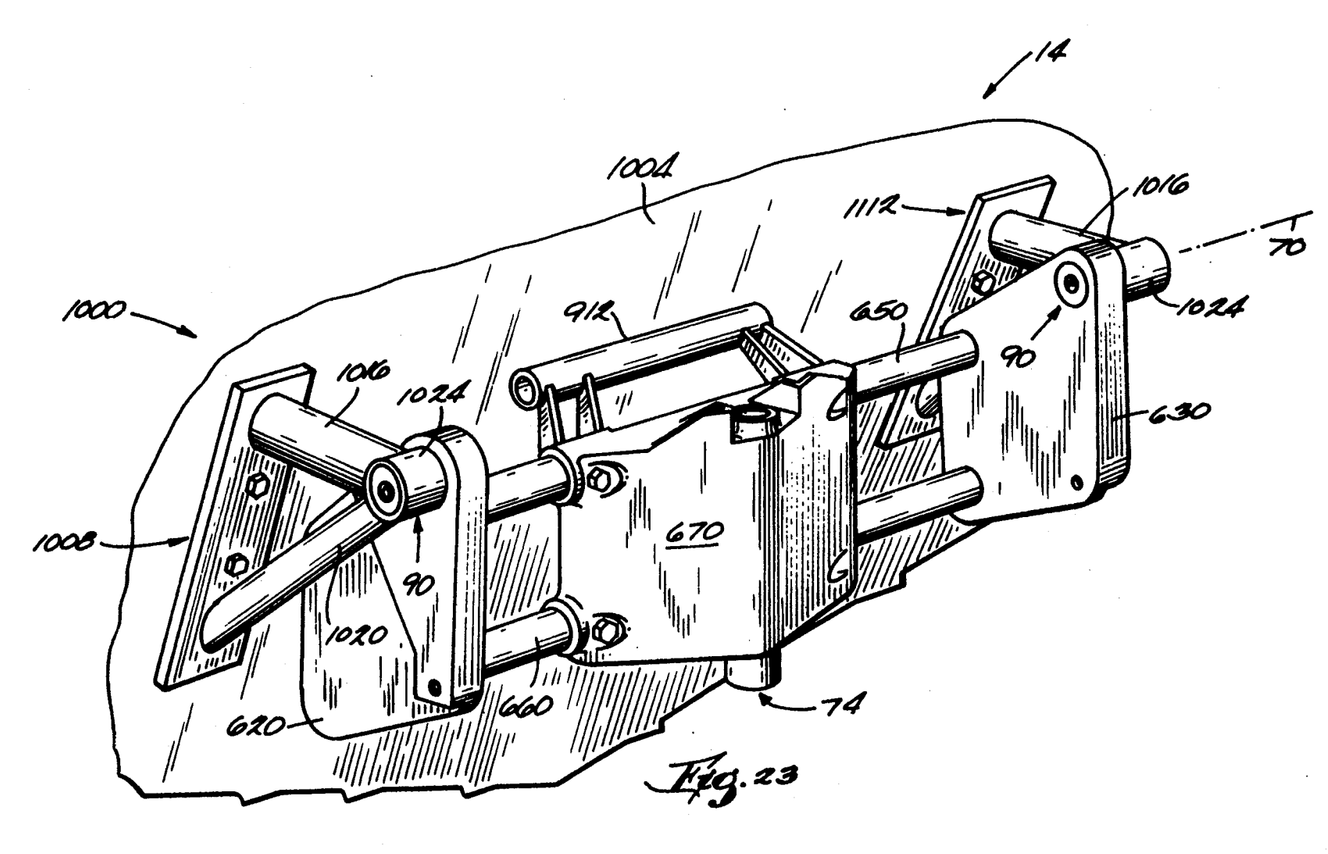
FIG. 23 is a partial perspective view of a fifth alternative embodiment of the invention.

A marine apparatus 1000 which is a fifth alternative embodiment of the invention is partially illustrated in FIG. 23. Except as described below, the marine apparatus 1000 is substantially identical to the marine apparatus 600, and common elements have been given the same reference numerals.

In the marine apparatus 1000, the boat 14 includes a conventional transom 1004, and the marine apparatus 1000 comprises port and starboard supporting brackets 1008 and 1012, respectively, extending rearwardly from and fixedly mounted on the transom 1004. Each of the supporting brackets 1008 and 1012 includes an upper leg 1016 extending generally horizontally and rearwardly from the transom 1004 and having an outer end, a lower leg 1020 (only the lower leg 1020 of the bracket 1012 is shown) extending upwardly and rearwardly from the transom 1004 and having an outer end, and a generally cylindrical supporting portion 1024 integrally connected to the outer ends of the upper and lower legs 1016 and 1020. The supporting portion 1024 has an inner surface (not shown) defining a generally vertical wall and has therethrough a generally cylindrical bore (not shown). The cylindrical bores of the supporting brackets correspond to the bores 48 in the walls 42 and 46 of the marine apparatus 600.

The mounting bracket 74 of the marine apparatus 1000 is substantially identical to the mounting bracket 74 of the marine apparatus 600. The port side portion 620 of the mounting bracket 74 is pivotally connected to the port supporting bracket 1008 for pivotal movement relative thereto about the tilt axis 70, and the starboard side portion 630 of the mounting bracket 74 is pivotally connected to the starboard supporting bracket 1012 for pivotal movement relative thereto about the tilt axis 70. The side portions 620 and 630 are pivotally connected to the supporting brackets 1008 and 1012 by the trunnion assemblies 90 in the same manner that the side portions 620 and 630 are connected to the walls 42 and 46 in the marine apparatus 600. The outboard motor (not shown) of the marine apparatus 1000 is mounted on the mounting bracket 74 in the same manner as in the marine apparatus 600.

Various features of the invention are set forth in the following claims.

We claim:

1. Marine apparatus comprising a boat hull including an aft end, and opposed first and second walls extending generally in the fore and aft direction, a propulsion unit including a drive shaft housing and a kingpin in forwardly spaced relation to said drive shaft housing, and means connected to said first and second walls for supporting said propulsion unit for pivotal movement relative to said boat hull about a generally horizontal axis extending through said first and second walls, said means including a kingpin bore located forwardly of said aft end and rotatably receiving said kingpin.

2. Apparatus as set forth in claim 1 wherein said means includes a mounting bracket which is connected to said walls for pivotal movement relative thereto about said axis and which includes a swivel bracket portion having therein said kingpin bore.

3. Apparatus as set forth in claim 2 wherein said bracket also includes a first side portion pivotally connected to one of said walls and a second side portion pivotally connected to the other of said walls.

4. Apparatus as set forth in claim 3 wherein said swivel bracket portion is connected directly to said side portions.

5. Apparatus as set forth in claim 4 wherein said swivel bracket portion and said side portions are integrally connected.

6. Apparatus as set forth in claim 2 and further comprising tilt means for causing pivotal movement of said mounting bracket relative to said hull, said tilt means including an extendible and contractible link extending between said hull and said mounting bracket.

7. Apparatus as set forth in claim 6 wherein said mounting bracket is pivotable about said tilt axis relative to a normal operating position, and wherein said link is connected to said mounting bracket for pivotal movement relative thereto about a generally horizontal axis located substantially directly beneath said tilt axis when said mounting bracket is in said normal operating position.

8. Apparatus as set forth in claim 7 wherein said link extends generally horizontally when said mounting bracket is in said normal operating position.

9. Apparatus as set forth in claim 1 wherein said axis intersects said walls.

10. Apparatus as set forth in claim 9 wherein said hull also includes a lateral wall extending between said opposed walls, and wherein said axis is located aft of said lateral wall.

11. Apparatus as set forth in claim 1 wherein said hull also includes an unreinforced fiberglass wall extending generally vertically and between said opposed walls.

12. Apparatus as set forth in claim 1 and further comprising a propulsion unit including a rotatably mounted propeller shaft and having a center of gravity, wherein said means supports said propulsion unit on said hull, and wherein said axis extends substantially through said center of gravity.

13. Apparatus as set forth in claim 1 and further comprising a propeller shaft rotatably supported by said drive shaft housing, and an engine supported by said drive shaft housing and drivingly connected to said propeller shaft, wherein said drive shaft housing has a forward edge, wherein propulsion unit support means supports said drive shaft housing for common pivotal movement therewith, and wherein said horizontal axis is located aft of said forward edge.

14. Apparatus as set forth in claim 1 and further comprising means defining a generally vertical steering axis, and wherein said horizontal axis is located aft of said steering axis.

15. Marine apparatus comprising a boat hull including opposed first and second walls extending generally in the fore and aft direction, a propulsion unit including a drive shaft housing and a kingpin in forwardly spaced relation to said drive shaft housing, a mounting bracket having therein a kingpin bore which rotatably receives said kingpin and which defines a generally vertical steering axis, said bracket including means connected to said walls and defining a generally horizontal tilt axis located, when the marine propulsion unit is in a normal running position, aft of said steering axis.

16. Marine apparatus as set forth in claim 15 wherein said means defining said steering axis includes said bore.

17. Marine apparatus comprising a boat hull including an aft end, and opposed first and second walls extending generally in the fore and aft direction, a propulsion unit including a drive shaft housing and a kingpin in forwardly spaced relation to said drive shaft housing, and a mounting bracket including a first side portion pivotally connected to one of said opposed walls for pivotal movement relative thereto about a generally horizontal tilt axis extending through said opposed walls, a second side portion pivotally connected to the other of said opposed walls for pivotal movement relative thereto about said tilt axis, and structure which extends between said side portions and which includes a kingpin bore located forwardly of said aft end and rotatably receiving said kingpin.

18. Marine apparatus as set forth in claim 17 and further comprising tilt means for causing pivotal movement of said mounting bracket relative to said boat, said tilt means including a first extendible and contractible link extending between said hull and said first side portion, and a second extendible and contractible link extending between said hull and said second side portion.

19. Marine apparatus as set forth in claim 18 wherein said mounting bracket is pivotable about said tilt axis relative to a normal operating position, and wherein said first and second links are connected to said side portions for pivotal movement relative thereto about a generally horizontal axis located substantially directly beneath said tilt axis when said mounting bracket is in said normal operating position.

20. Marine apparatus as set forth in claim 19 wherein said links extend generally horizontally when said mounting bracket is in said normal operating position.

21. Marine apparatus as set forth in claim 17 wherein said mounting bracket further includes a swivel bracket portion fixed to said structure and including said kingpin bore which is adapted to support the propulsion unit for pivotal movement relative to said swivel bracket portion about a generally vertical steering axis.

22. Marine apparatus as set forth in claim 17 wherein said tilt axis intersects said opposed walls.

23. Marine apparatus as set forth in claim 22 wherein said hull also includes a lateral wall extending between said opposed walls, and wherein said axis is located aft of said lateral wall.

24. Marine apparatus comprising a boat hull including opposed first and second walls extending generally in the fore and aft direction, a propulsion unit including a drive shaft housing and a kingpin in forwardly spaced relation to said drive shaft housing, and a mounting bracket including a first side portion pivotally connected to one of said opposed walls for pivotal movement relative thereto about a generally horizontal tilt axis, a second side portion pivotally connected to the other of said opposed walls for pivotal movement relative thereto about said tilt axis, structure which extends between said side portions and includes upper and lower cross members, a swivel bracket portion including upper and lower recesses and a kingpin bore which rotatably receives said kingpin to afford pivotal movement of said propulsion unit relative to said swivel bracket portion about a generally vertical steering axis, clamp means defining upper and lower recesses respectively mating with said upper and lower recesses of said swivel bracket portion to define upper and lower bores respectively housing said upper and lower cross members, and means for connecting said swivel bracket portion and said clamp means.

25. Marine apparatus as set forth in claim 24 wherein said clamp means includes means for supporting a steering apparatus.

26. Marine apparatus as set forth in claim 24 wherein said swivel bracket portion also has therein a second upper recess and a second lower recess, and wherein said clamp means also defines second upper and lower recesses respectively mating with said second upper and lower recesses of said swivel bracket portion to define second upper and lower bores respectively housing said upper and lower cross members.

27. Marine apparatus as set forth in claim 25 wherein said clamp means has therein a bore and wherein said supporting means includes said bore.

28. Marine apparatus comprising a boat hull including opposed first and second walls extending generally in the fore and aft direction, a mounting bracket including a kingpin bore adapted to rotatably house a kingpin of a propulsion unit, means on said mounting bracket and on said walls for connecting said mounting bracket to said walls for pivotal movement of said mounting bracket relative to said walls about a generally horizontal axis, means including an extendible and contractible link extending between said hull and said mounting bracket for causing pivotal movement of said mounting bracket relative to said hull, and extendible and contractible means operable in response to the application of pressurized hydraulic fluid to cause pivotal movement of the propulsion unit relative to said mounting bracket.

29. Marine apparatus comprising a boat hull including an aft end, and opposed first and second walls extending generally in the fore and aft direction, a propulsion unit including a drive shaft housing and a kingpin in forwardly spaced relation to said drive shaft housing, a mounting bracket connected to said walls for pivotal movement relative thereto about a generally horizontal tilt axis extending through said opposed walls, said mounting bracket including a kingpin bore located forwardly of said aft end and rotatably receiving said kingpin, and means for causing pivotal movement of said mounting bracket relative to said hull, said mounting bracket transmitting forces to said boat solely through said tilt axis and said pivot movement causing means.

30. Marine apparatus as set forth in claim 29 wherein said mounting bracket is pivotable about said tilt axis relative to a normal operating position, and wherein said tilt means includes an extendible and contractible link having one end pivotally connected to said hull and having an opposite end connected to said mounting bracket for pivotal movement relative thereto about a generally horizontal axis located substantially directly beneath said tilt axis when said mounting bracket is in said normal operating position.

31. Marine apparatus as set forth in claim 29 wherein said link extends generally horizontally when said mounting bracket is in said normal operating position.

32. Marine apparatus comprising a boat hull including an aft end, and opposed first and second walls extending generally in the fore and aft direction, a mounting bracket connected to said walls for pivotal movement relative thereto about a generally horizontal tilt axis extending through said opposed walls and relative to a normal operating position and including a kingpin bore located forwardly of said aft end, and an extendible and contractible link having one end pivotally connected to said hull and having an opposite end pivotally connected to said mounting bracket about a generally horizontal axis located substantially directly beneath said tilt axis when said mounting bracket is in said normal operating position, said link extending substantially horizontally between said ends.

33. Marine apparatus as set forth in claim 32 wherein said link extends generally horizontally when said mounting bracket is in said normal operating position.

34. Marine apparatus comprising a boat hull including opposed first and second walls extending generally in the fore and aft direction, a propulsion unit including a drive shaft housing and a kingpin in forwardly spaced relation to said drive shaft housing, a mounting bracket connected to said walls for pivotal movement relative thereto about a generally horizontal tilt axis and including a kingpin bore which extends along an axis extending forwardly of said tilt axis and which receives said kingpin, said mounting bracket transmitting forces to said boat hull solely through said walls, and hydraulic means for causing pivotal movement of said mounting bracket relative to said hull about said tilt axis.

35. Marine apparatus as set forth in claim 34 wherein said mounting bracket is pivotable about said tilt axis relative to a normal operating position, and wherein said tilt means includes an extendible and contractible link having one end pivotally connected to said hull and having an opposite end connected to said mounting bracket for pivotal movement relative thereto about a generally horizontal axis located substantially directly beneath said tilt axis when said mounting bracket is in said normal operating position.

36. Marine apparatus as set forth in claim 34 wherein said link extends generally horizontally when said mounting bracket is in said normal operating position.

37. A marine apparatus comprising a boat hull including an aft end and opposed first and second walls extending generally in the fore and aft direction, a propulsion unit including a drive shaft housing and a kingpin in forwardly spaced relation to said drive shaft housing, a mounting bracket including a kingpin bore located forwardly of said aft end, defining a steering axis, and receiving said kingpin, and means on said mounting bracket and on said walls for connecting said mounting bracket to said walls for pivotal movement of said mounting bracket relative to said walls about a generally horizontal axis.

38. A marine apparatus comprising a boat hull including opposed first and second walls extending generally in the fore and aft direction, a propulsion unit including a drive shaft housing and a kingpin in forwardly spaced relation to said drive shaft housing, and means connected to said first and second walls for supporting said propulsion unit for pivotal movement relative to said boat about a generally horizontal axis extending through said first and second walls, said means including first and second portions located about said tilt axis, in spaced relation to each other axially of said tilt axis, in adjacent relation to said first and second walls, and free of connection to each other axially of and about said tilt axis, and a kingpin bore rotatably receiving said kingpin.

39. A marine apparatus comprising a boat hull including opposed first and second walls extending generally in the fore and aft direction, a propulsion unit including a drive shaft housing and a kingpin in forwardly spaced relation to said drive shaft housing, a mounting bracket connected to said walls for pivotal movement relative thereto about a generally horizontal tilt axis extending through said opposed walls and including a kingpin bore receiving said kingpin, and first and second extendible and contractible links having first ends respectively pivotally connected to said first and second walls and having opposite second ends respectively pivotally connected to said mounting bracket.

40. A marine apparatus comprising a boat hull including opposed first and second walls extending generally in the fore and aft direction, a mounting bracket including a transom portion, means on said mounting bracket and on said opposed walls for connecting said mounting bracket to said opposed walls for pivotal movement of said mounting bracket relative to said opposed walls about a first generally horizontal axis, an outboard motor including a transom bracket connected to said transom portion, a swivel bracket connected to said transom bracket for pivotal movement relative thereto about a second generally horizontal axis, a propulsion unit connect to said swivel bracket for movement in common with said swivel bracket about said second horizontal axis and for movement relative to said swivel bracket about a steering axis extending transversly to and forwardly of said first horizontal axis, and extendible and contractible means extending between said transom bracket and said swivel bracket for causing pivotal movement of said swivel bracket and said propulsion unit relative to said transom bracket about said second horizontal axis, and extendible and contractible means extending between said hull and said mounting bracket for causing pivotal movement of said mounting bracket relative to said hull about said first horizontal axis.

41. A marine apparatus comprising a boat hull including opposed first and second walls extending generally in the fore and aft direction and defining a recess which extends forwardly into said boat hull, and is open at the rear, at the top, and at the bottom, a mounting bracket including a transom portion, means on said mounting bracket and on said opposed walls for connecting said mounting bracket to said opposed walls for pivotal movement of said mounting bracket relative to said opposed walls about a first generally horizontal axis, an outboard motor located in said recess and including a transom bracket connected to said transom portion, a swivel bracket connected to said transom bracket for pivotal movement relative thereto about a second generally horizontal axis, a propulsion unit connect to said swivel bracket for movement in common with said swivel bracket about said second horizontal axis and for movement relative to said swivel bracket about a steering axis extending transversly to said horizontal axes, and extendible and contractible means extending between said transom bracket and said swivel bracket for causing pivotal movement of said swivel bracket and said propulsion unit relative to said transom bracket about said second horizontal axis, and first and second extendible and contractible means extending respectively between said said first and second walls and said mounting bracket for causing pivotal movement of said mounting bracket relative to said hull about said first horizontal axis.

* * * * *